J. R. HATHAWAY.
FASTENING MEANS FOR VEHICLE BODIES.
APPLICATION FILED DEC. 2, 1916.
1,259,397.
Patented Mar. 12, 1918.
2 SHEETS—SHEET 1.
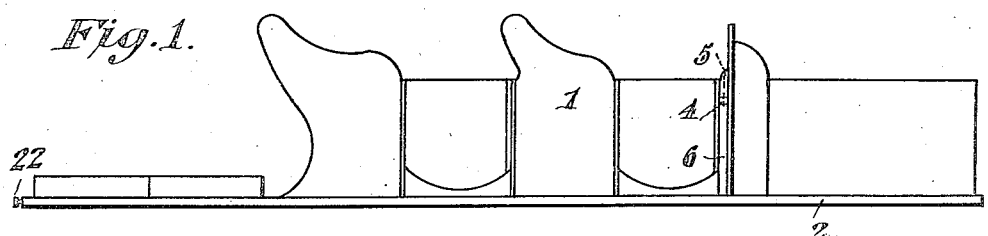
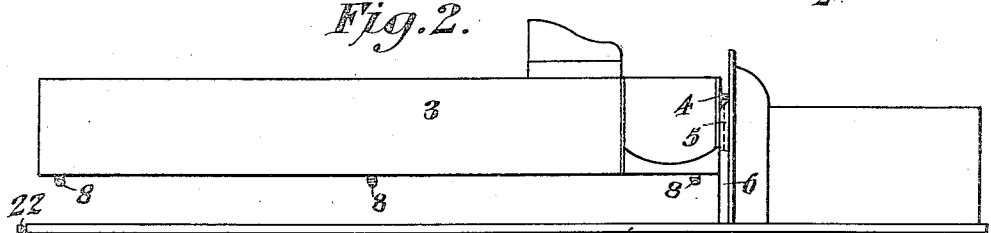
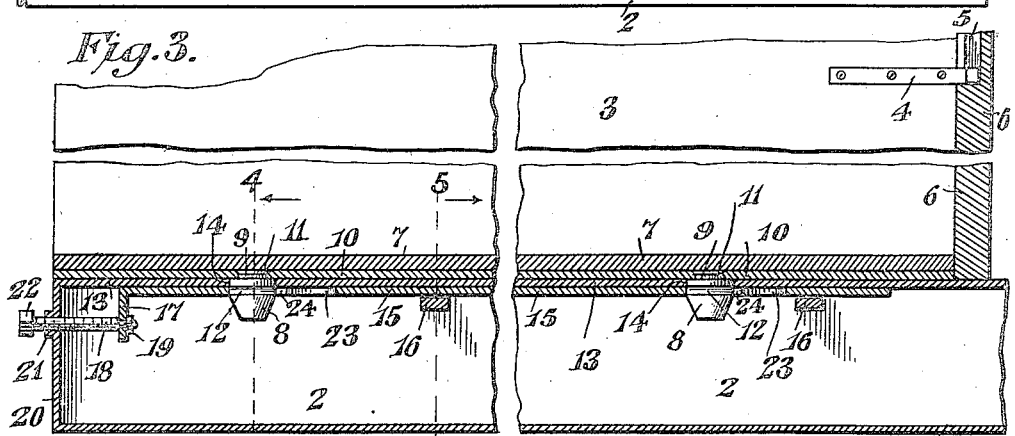
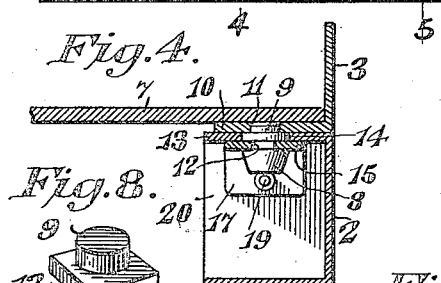
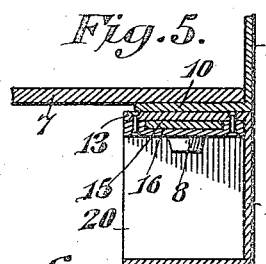
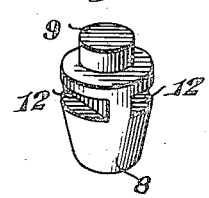
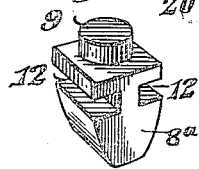
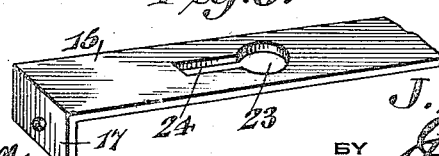
WITNESSES
INVENTOR
J. R. Hathaway,
BY
ATTORNEY J. R. HATHAWAY.
FASTENING MEANS FOR VEHICLE BODIES.
APPLICATION FILED DEC. 2, 1916.
1,259,397.
Patented Mar. 12, 1918.
2 SHEETS—SHEET 2.
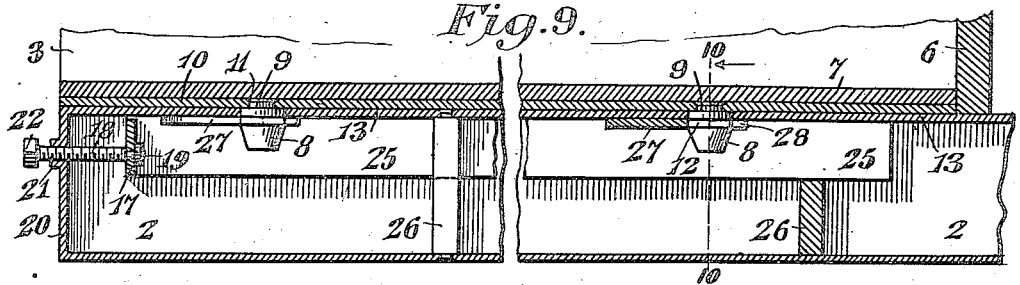
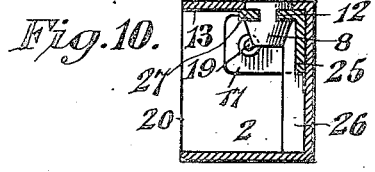 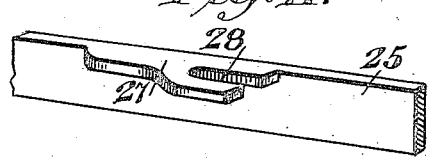
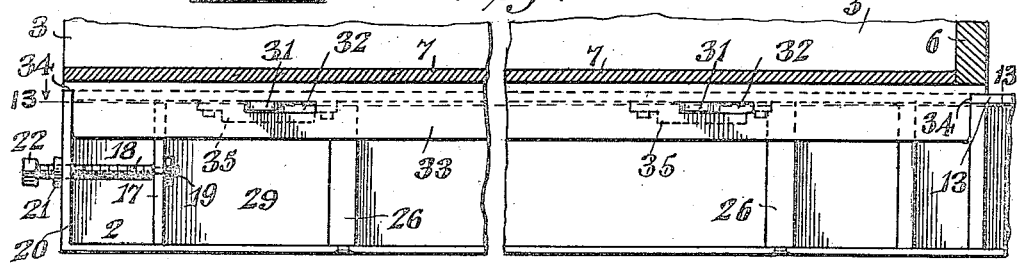
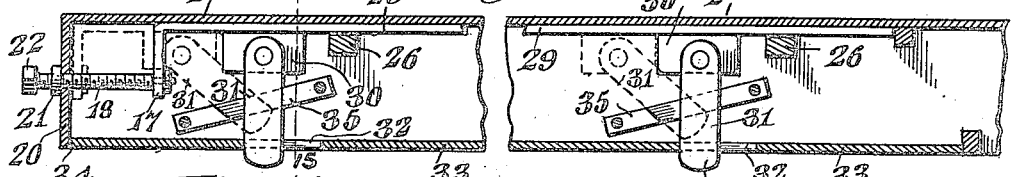
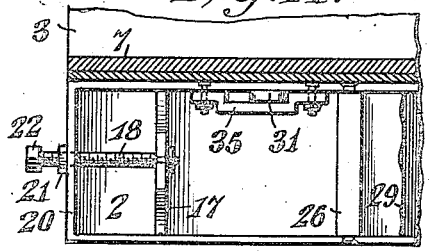 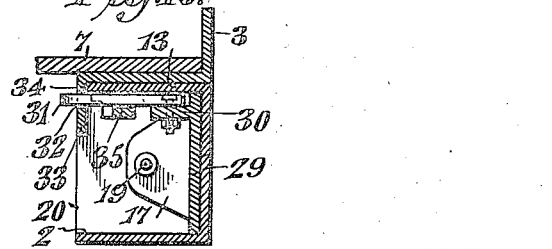
WITNESSES
INVENTOR
J. R. Hathaway,
BY
ATTORNEY

UNITED STATES PATENT OFFICE.

JAMES R. HATHAWAY, OF SUPERIOR, WISCONSIN.

FASTENING MEANS FOR VEHICLE-BODIES.

1,259,397.

Specification of Letters Patent.  Patented Mar. 12, 1918.

Application filed December 2, 1916. Serial No. 134,743.

*To all whom it may concern:*

Be it known that I, JAMES R. HATHAWAY, a citizen of the United States, residing at Superior, in the county of Douglas and State of Wisconsin, have invented a new and useful Fastening Means for Vehicle-Bodies, of which the following is a specification.

This invention has reference to fastening means for vehicle bodies, and its object is to provide a simple and readily accessible fastening means, whereby a vehicle body may be removably attached to the running gear.

The invention is more particularly useful in connection with automobiles, and especially with respect to providing for the ready interchangeability of automobile bodies, whereby a single chassis may be provided with two or more bodies for interchange thereof at will.

In accordance with the present invention the vehicle body and the chassis, and especially the side bars thereof, have respective coacting locking devices which may be interconnected at several points and be all operated from one end of the vehicle, especially the rear end, so that the body may be locked to or unlocked from the chassis from a readily accessible point, and when locked is practically free from danger of loosening.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a more or less schematic side elevation of one form of vehicle body and adjacent portion of the chassis assembled.

Fig. 2 is a view similar to Fig. 1 but showing another type of vehicle body and chassis partly separated.

Fig. 3 is an upright section through a portion of a vehicle body and one of the side bars or beams of the chassis in the assembled position.

Fig. 4 is a section on the line 4—4 of Fig. 3.

Fig. 5 is a section on the line 5—5 of Fig. 3.

Fig. 6 is a detail perspective view of one of the locking slides.

Figs. 7 and 8 are perspective views of different forms of locking lugs.

Fig. 9 is a view similar to Fig. 3, but showing a somewhat different form of locking means.

Fig. 10 is a section on the line 10—10 of Fig. 9.

Fig. 11 is a perspective view of a portion of one of the locking members shown in Figs. 9 and 10.

Fig. 12 is a view similar to Figs. 3 and 9 but showing still another form of locking means.

Fig. 13 is a section on the line 13—13 of Fig. 12.

Fig. 14 is a view of a portion of the structure of Fig. 12, but with some parts in section to disclose more distant parts.

Fig. 15 is a section on the line 15—15 of Fig. 13.

Referring to the drawings, there is shown a vehicle body 1 and the side beams 2 of the running gear or chassis of the vehicle. The vehicle body 1 may be indicative of any type of vehicle body and may be replaced by another vehicle body 3 shown in Fig. 2. The vehicle body 1 may be of a touring car type and the vehicle body 3 may be of the delivery or truck type, or any other type of body may be considered as represented by the two forms shown.

The side bars of the frames of automobile running gear are customarily made of channel form, as indicated in the drawings, although no attempt is made to show any particular channel construction, since the side bars vary in different makes of vehicles.

In the structure of Figs. 1 to 6 the removable body, which may be assumed to be the body 3, has a headed member 4 at one end adapted to take in a correspondingly shaped groove 5 in a dash 6 or other portion forming a permanent part of the vehicle in the sense that it is not removable therefrom with the body. Such member 4 is designed to resist disturbing forces exerted lengthwise of the vehicle body and correspondingly relieve certain parts to be described from strains due to such forces.

Secured to the bottom member 7 of the body of the vehicle are lugs 8 each provided with an axial stem 9 which may be introduced through a plate 10 fast on the bottom member 7 and there upset or riveted, as indicated at 11. The lugs 8 may be conical, as indicated in Fig. 7, or more or less tapering but otherwise of rectangular outline, as shown at 8ª in Fig. 8. Each lug is formed near its rivet end with oppositely disposed recesses or channels 12 at an appropriate distance from the rivet or base end 9.

Each channel side bar 2 has one web 13, which may constitute the top web of the channel in the installed position, formed with a suitable number of passages 14 through which, when the body is applied to the running gear, the lugs 8 or 8ª project, the taper or conical free ends of these lugs facilitating the introduction of the lugs through the passages 14.

Within each channel 2 there is arranged a slide 15 which may be in the form of an elongated flat bar supported at intervals by guide straps 16 or in any other suitable manner. Each slide has an angle end 17 to which is secured a screw stem 18 by a swivel connection 19, or in any other manner permitting the turning of the stem 18 about its longitudinal axis with relation to the slide. The corresponding end of the channel 2 is formed with an end wall 20 or is otherwise arranged to provide for a nut 21 through which the screw stem 18 is threaded. For convenience of manipulation the stem 18 may have at the end remote from the swivel 19 a head 22 suitable for the application of a tool to turn the screw stem.

The slide 15 is formed at intervals with passages 23 corresponding in spacing to the spacing of the lugs 8 and each passage has a radial slot 24 extending therefrom and communicating therewith, the slot being lengthwise of the slide, so that the passage 23 and slot 24 together form a keyhole slot.

When the vehicle body is to be placed on or removed from the running gear, the slide 15 is moved to a position where the passages 14 and 23 register, and in the particular showing of Fig. 3 this means that the slide 15 is drawn toward the end 20 of the side bar to its fullest extent. When the vehicle body is placed upon the running gear the lugs 8 project through the registering passages 14 and 23 to an extent bringing the slots 12 in line with the portions of the slide 15 defining the slots 24. Now, upon a suitable manipulation of the screw rod 18, as by means of a wrench applied to the head 22, the slide 15 is moved lengthwise until those portions of the slide 15 containing the slots 24 are in embracing relation to the lugs 8 and enter the recesses 12. This constitutes an effective lock firmly connecting the body of the vehicle with the running gear. Two or three or more of the lugs 8 on each side of the vehicle body will be found ample to secure the vehicle body to the running gear against any liability of breaking away therefrom under running conditions.

The heads 22 may be arranged at the rear ends of the side bars 2 and hence are always readily accessible to a person desiring to move the slide 15 and are also very conveniently accessible, wherefore it is an easy matter and one taking but little time to change from one body to another. There is little liability of accidental or spontaneous movement of the slide 15 sufficient to loosen the body, because the parts may be made to fit sufficiently snug to overcome any tendency of loosening and it is, moreover, an easy matter to apply any of the usual locking means for holding the screw stems or rods 18 from accidentally turning. When it is desired to remove a vehicle body from the running gear, it is only necessary to manipulate the rods 18 on opposite sides of the vehicle until the slides 15 have the openings 23 registering with the openings 14, whereupon the vehicle body may be lifted from the vehicle and another body substituted.

While the lugs 8 effectively prevent the vehicle body from moving lengthwise of the running gear, strain is taken from the lugs 8 by the members 4.

In Figs. 9, 10 and 11 there is shown a slide 25 which instead of underriding the top web of the side bar 2 extends along one side web thereof with one edge of the slide 25 immediately beneath the top web of the bar 2, the slide 25 being held in place by supports 26. At suitable intervals the slide 25 is formed with offstanding forks 27 having entering slots 28 in one end of each and adapted to straddle the corresponding lugs 8 and enter the recesses 12 thereof. The forks 27 are of such length and so disposed that when the slide 25 is moved lengthwise they will move into or out of straddling relation to lugs 8 extending through the openings 14. The forks 27 take the place of the slots 23 and 24. Otherwise the structure of Figs. 9, 10 and 11 is or may be the same as the structure shown in the preceding figures.

Another example of locking means for retaining the body on the running gear is shown in Figs. 12 to 15. Each channel beam 2 contains a slide 29 similar to the slide 25, but the width of the slide may be substantially the same as the height of the interior of the channel 2, so as to be guided and supported by the top and bottom webs of the channel. The slide 29 has ears 30 thereon at suitable intervals and pivoted to each ear 30 is one end of a latch bolt 31, the other end of which is movable into and out of a slot 32 in a flange 33 formed on a corresponding edge of the plate 10 extending along one long edge of the side bar 2, which latter may be recessed, as shown at 34, to receive the flange 33. Each latch 31 is supported near its free end by a guide strap 35 fast on the top flange of the channel bar 2.

With such an arrangement a longitudinal movement of the slide 29 with the latch 31 capable of pivotal action in the strap 35, the free end of the latch 31 has a projecting and withdrawing movement which will cause it to enter the slot 32 in one movement of the slide 29 and to move out of the slot 32 on the reverse movement of the slide 29.

In all the arrangements described the idea is to effect the locking of the body to or the unlocking of the body from the running gear at each side thereof by a single movement of an element controlling all the locking devices on the same side of the vehicle. Furthermore, the arrangement is such that the manipulating means for the locking devices is capable of situation to be readily accessible, and preferably accessible from the rear of the vehicle where access is easy. Moreover, the locking devices are not only of extremely simple construction, but are highly efficient and are not at all liable to accidental movement to the unlocked position after being locked.

What is claimed is:—

1. The combination with a vehicle having a running gear provided with channel side bars, of a removable vehicle body adapted to rest upon and be supported by the side bars, and locking means for connecting the vehicle body to and disconnecting it from the running gear including longitudinally movable slides lodged within the channels of the side bars and movable lengthwise thereof, said slides having manipulating means accessible at one end of the side bar carrying it, and the side bar and vehicle body having coacting locking devices controlled by the slide.

2. The combination with a vehicle running gear having channel side bars with each channel opening toward the opposite side bar, of a removable vehicle body adapted to rest upon and be supported by the side bars, and locking means for connecting the vehicle body to and disconnecting it from the running gear including a longitudinally extended and movable slide within each channel bar, with the slide and vehicle body provided with coacting locking means, and each slide having manipulating means accessible at one end of the channel bar.

3. The combination of a vehicle running gear, including channel side bars, a removable body for the running gear adapted to the side bars, and locking means for connecting the body to and disconnecting it from the side bars and including longitudinally movable slides mounted in the side bars and provided with manipulating means in the form of screws connected to the slides and threaded through the ends of the side bars and accessible for manipulation beyond one end of each side bar.

4. In a vehicle, the combination of running gear with channel bars each with passages through a web thereof, a vehicle body with a corresponding number of lugs adapted to the passages in the channel bars, with the lugs having grooves situated to be within the channel bars when the lugs extend through the passages therein, a slide within each channel bar having locking passages for the lugs situated to be traversed by the lugs, and manipulating means for the slide for moving it lengthwise of the channel bar and extending through one end of the channel bar and there accessible for manipulation.

5. In a vehicle, the combination with running gear having channel side bars, a vehicle body adapted to the channel side bars, each side bar having passages through the top flange thereof, and the vehicle body having lugs adapted to extend into the channel bars through the passages thereof with each lug having recesses situated on the lug to be located within the channel bar when the body of the vehicle is on the channel bar, and a longitudinally movable slide extending lengthwise of and within the channel bar and provided with passages adapted to receive the lugs and to enter the slots therein, said slide having means for its manipulation, at will.

6. In a vehicle, the combination with running gear having channel side bars, a vehicle body adapted to the channel side bars, each side bar having passages through the top flange thereof and the vehicle body having lugs adapted to extend into the channel bars through the passages thereof with each lug having recesses situated on the lug to be located within the channel bar when the body of the vehicle is on the channel bar, and a longitudinally movable slide extending lengthwise of and within the channel bar and provided with passages adapted to receive the lugs and to enter the slots therein, said slide having means for its manipulation at will, said last-named means comprising a screw rod swiveled to the slide and threaded through the corresponding end of the channel bar and there having means for the application of a manipulating tool.

In testimony that I claim the foregoing as my own, I have hereto affixed my signature in the presence of two witnesses.

JAMES R. HATHAWAY.

Witnesses:
    JOHN HOWE,
    LUCILLE HOWE.